(12) United States Patent
Greenwood et al.

(10) Patent No.: US 6,294,900 B1
(45) Date of Patent: Sep. 25, 2001

(54) BI-DIRECTIONAL AC OR DC VOLTAGE REGULATOR

(75) Inventors: Simon Richard Greenwood, Cheshire (GB); Stephen Soar, Temple Works, Temple Street, Oldham, Lancashire (GB), OL1 3NJ

(73) Assignees: Simon R. Greenwood; Stephen Soar, both of Cheshire (GB)

( * ) Notice: Subject to any disclaimer, the term of this patent is extended or adjusted under 35 U.S.C. 154(b) by 0 days.

(21) Appl. No.: 09/623,777

(22) PCT Filed: Mar. 1, 1999

(86) PCT No.: PCT/GB99/00601
§ 371 Date: Nov. 13, 2000
§ 102(e) Date: Nov. 13, 2000

(87) PCT Pub. No.: WO99/46850
PCT Pub. Date: Sep. 16, 1999

(30) Foreign Application Priority Data

Mar. 11, 1998 (GB) .................................................. 9805021

(51) Int. Cl.$^7$ ................................. G05F 1/10; H02M 7/00
(52) U.S. Cl. ................................. 323/222; 363/65; 363/97
(58) Field of Search ..................... 323/222, 271, 323/272, 282, 274; 363/17, 21, 24, 25, 65, 71, 45, 124, 97

(56) References Cited

U.S. PATENT DOCUMENTS

| | | | |
|---|---|---|---|
| 4,186,437 | * 1/1980 | Cuk | 363/65 |
| 4,257,087 | * 3/1981 | Cuk | 363/16 |
| 4,720,668 | * 1/1988 | Lee et al. | 323/271 |
| 4,823,249 | * 4/1989 | Garcia, II | 363/48 |
| 5,321,597 | 6/1994 | Alocoque . | |

OTHER PUBLICATIONS

"Nonlinear Continuous Time Control of a Bidirectional Coupled–Inductor Cuk Converter" IEICE Transactions on Communications, vol. E75, No. 11, Nov. 1992, pp. 1134–1141, XP000336069, Joan Majo, et al.
Patent Abstracts of Japan, vol. 15. No. 340 (E–1105), Aug. 28, 1991 & JP 03 128676 A.
Marian K. Kazimierczuk et al.: "Topologies of Bidirectional PWM DC–DC Power Converters" May 28, 1993, pp. 435–441.
Ray Biswajit: "Bidirectional DC/DC Power Converstion Using Constant–frequency Quasi–resonant Topology" 1993 IEEE International Symposium on Circuits and Systems, May 6, 1993, pp. 2347–2350.

* cited by examiner

Primary Examiner—Rajnikant B. Patel
(74) Attorney, Agent, or Firm—Katten Muchin Zavis

(57) ABSTRACT

The invention provides a bi-directional voltage regulator having a controller, an input circuit and an output circuit, the input and output circuits being capacitively coupled one to the other and being symmetrical one relative to the other, wherein each circuit comprises two terminals (AC1, AC2; AC3, AC4) across which are connected a capacitor (C2a; C2b) and, in parallel with the capacitor (C2a; C2b), a series connection of an inductor (L1; L2) and a switching network (S1; S2) controlled by the controller. Each switching network (S1; S2) has two branches in anti-parallel, of which each branch permits only uni-directional current flow and at least one branch comprises a switching means. If one branch only of each switching network comprises a switching means then the regulator of the invention is a DC regulator which has the advantage over conventional Ćuk converters in that it permits bi-directional power flow. If both branches of each switching network comprise switching means, then the device may be constructed as an AC or DC regulator/transformer which retains the capacity to permit bi-directional power flow.

9 Claims, 5 Drawing Sheets

BI-DIRECTIONAL AC OR DC VOLTAGE REGULATOR

DESCRIPTION

1. Technical Field

The present invention relates to the field of electrical power supplies, and particularly although not exclusively to a bi-directional AC or DC voltage regulator.

2. Background Art

A conventional AC variable transformer (a variac) for stepping down a mains voltage, for example 230 volts AC to a reduced Ac voltage, comprises AC voltage input terminals, across which is connected an inductive winding, and AC output terminals, which draw power from the winding at a selectable voltage, depending upon where a wiper blade is positioned along the winding. The wiper is typically a rotating wiper which rotates across the winding which is formed in a substantially cylindrical or ring shape. The wiper may be driven by a servo motor, in order to automatically move the wiper, thus varying the output voltage in response to a control signal.

However, the conventional variac has the problems of high weight, large size and poor response time in moving the wiper blade, and produces noise which is fed back onto the mains supply and through to the output terminals.

An apparatus which has been used in DC power systems to transform and regulate voltage is the Ćuk converter. Such a device is described in U.S. Pat. No. 4,186,437 and in a paper entitled "Topologies of Bi-directional PWM DC—DC Power Converters" from the 1993 IEEE National Aerospace and Electronics Conference. A basic topology Ćuk converter, as illustrated in FIG. 1 of the drawings, has a circuit comprising input and output choke inductances L1 and L2, an energy-transfer capacitor C1, an output smoothing capacitor C2, a diode D1 and a switching transistor Q1.

This arrangement permits the DC output voltage to be stepped up or stepped down for a given input voltage depending on the proportion of time the transistor Q1 conducts during a period of its operation. This ratio is known as the duty cycle of the transistor.

During a first time interval when the transistor Q1 is off, the diode D1 is forward biased and the capacitor C1 is charged in the positive direction through the inductor L1. During a second time interval, the transistor Q1 is turned on, and the capacitor C1 becomes connected across the diode D1, reverse biasing it. Thus the capacitor C1 discharges through the load and the output inductance L2, charging the output capacitor C2 to a negative potential. The circuit operation is repeated when the transistor Q1 is turned off again.

The DC output voltage $V_{out}$ is dependent upon a number of parameters. Firstly the input voltage $V_{in}$ naturally effects the voltage value across the output terminals of the converter. If all other parameters are kept constant and the input voltage $V_{in}$ is increased, the DC output voltage of the converter will also increase. As discussed previously, the duty cycle ($\delta$) of conduction of the transistor Q1 is another parameter which effects the DC output voltage $V_{out}$. A high duty cycle ($\delta$) may yield a stepped up voltage at the output terminals, while a low duty cycle ($\delta$) will produce an output voltage $V_{out}$ which is smaller in magnitude than the input voltage $V_{in}$. The remaining principal parameter which controls converter performance is the converter circuit efficiency ($\epsilon$).

It has been evaluated that the voltage relationship between the output signal and the input signal is as follows:

$$V_{out}/V_{in} = \delta \epsilon / (1-\delta)$$

Further extensions of the converter, illustrated in FIGS. 2 to 4, have a similar operation to that discussed above.

FIG. 2 shows a Ćuk converter in which the input and output choke inductors L1 and L2 are coupled by a common core. There are obvious advantages in developing the converter in this way, namely, reductions in converter size, weight and component numbers, while the basic DC-to-DC conversion properties of the converter remain unchanged. Further, it has been shown that a significant reduction in ripple current magnitudes can be achieved by magnetic coupling of the choke inductances L1 and L2.

FIG. 3 illustrates how an isolating transformer TX1 can be introduced to the Ćuk converter to provide galvanic isolation between the output and the input voltages $V_{out}$ and $V_{in}$. As the transformer TX1 is isolated by the two energy-transfer capacitors C1a and C1b, no DC transformer core magnetization can take place.

The Ćuk converter illustrated in FIG. 4 has coupling of the input and output inductances L1 and L2 and an isolating transformer TX1. This converter benefits from the features described above but its basic operation remains unchanged.

The Ćuk converters discussed so far permit only DC voltage/current transformation and allow power to flow in one direction only. In order to fully understand the invention, a further possible extension of the Ćuk converter is described below, with reference to FIGS. 5 and 6 of the drawings.

Although the converter illustrated in FIG. 5 is similar to a basic topology Ćuk converter and is essentially a DC regulator, the additional components, a second transistor Q2 and second diode D2, permit bi-directional operation of the converter.

The controlling signals supplying the base of the transistors switch each of the transistors on and off alternately, in anti-phase with each other.

During a first time interval, when the first transistor Q1 is off and the second transistor Q2 is on, the first diode D1 is forward biased and the energy-transfer capacitor Q1 is charged in the positive direction through the input inductor L1.

During a second time interval, when the first transistor Q1 is on and the second transistor Q2 is off, the energy-transfer capacitor C1 is connected across the first diode D1, reverse biasing it. Therefore, the energy-transfer capacitor C1 discharges through the output load and inductance L2, and in the process charges the output capacitance C2b to a negative potential.

The circuit operation described above is similar to that of a basic topology Ćuk converter. However, the converter of FIG. 5 is symmetrical in respect of the inputs and the outputs, and therefore will permit power flow in either direction.

As described previously, use can be made of a common core to couple the input and output choke inductances L1 and L2 to reduce ripple, and/or an isolating transformer TX1 to provide galvanic isolation. FIG. 6 illustrates the addition of such an isolating transformer TX1 to the circuit of FIG. 5.

Ćuk converter technology has been used exclusively to convert a DC input voltage to a DC output voltage, and is essentially uni-directional in terms of power flow. A further example of the prior art is given in U.S. Pat. No. 5,321,597 which discloses a complex Ćuk-like circuit which is primarily used as a galvanic isolation device for DC electrical signals.

The present Application addresses the problem of providing an apparatus which permits bi-directional power flow so as to be able to accommodate regenerative load currents. In a preferred aspect, the invention provides an AC or DC voltage regulator/converter which, while functionally analogous to conventional iron/copper AC transformers, benefits from solid state control so as to permit a reduction in weight, size and cost while improving performance when compared to conventional means.

SUMMARY OF THE INVENTION

According to a first aspect of the invention there is provided a bi-directional AC or DC voltage regulator having a controller, an input circuit and an output circuit, the input and output circuits being capacitively coupled one to the other and being symmetrical one relative to the other, wherein each circuit comprises two terminals across which are connected a capacitor and, in parallel with the capacitor, a series connection of an inductor and a switching network controlled by the controller wherein;

each switching network has two branches in anti-parallel, and each branch comprises a switching means (Q1,Q2; Q3,Q4) for permitting only uni-directional current flow; CHARACTERIZED IN THAT:

The controller operates at high frequency the switching means in the input circuit which, if closed, would permit current flow through the switching network, and simultaneously operates the oppositely aligned switching means in the output circuit so that it is in the opposite switching state to the high frequency operated switching means in the input circuit.

Preferably, an isolation transformer in conjunction with a pair of energy transfer capacitors can be inserted between the input and output circuits permitting magnetic and capacitive coupling thereof. Alternatively, the input and output circuits may be coupled capacitively only, through a single energy transfer capacitor.

Where a transformer is used to couple the input circuit to the output circuit, the turns ratio may be selected so as to establish the required output voltage range for a given input voltage.

In a further embodiment of the present invention, the inductor of the input circuit is magnetically coupled to the inductor of the output circuit.

Preferably, each switching means effectively comprises a series connection of a transistor and an aligned diode.

Preferably, the controller monitors the polarity of the input voltage so as to establish which of the switching means would, if closed, permit current to flow through the switching network.

Preferably, the duty cycle of the transistors in the input and output circuits which are operated at high frequency can be varied so as to vary the actual output voltage within an output voltage range.

Preferably, those transistors not operated at high frequency are held closed.

THE DRAWINGS

Figure 1:
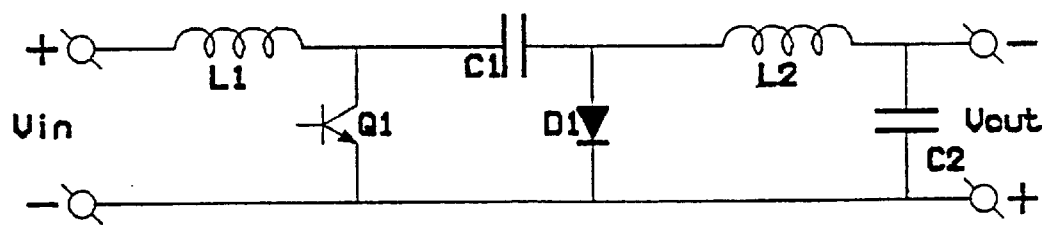
FIG. 1 is a network drawing of a basic topology Ćuk converter.
Figure 2:
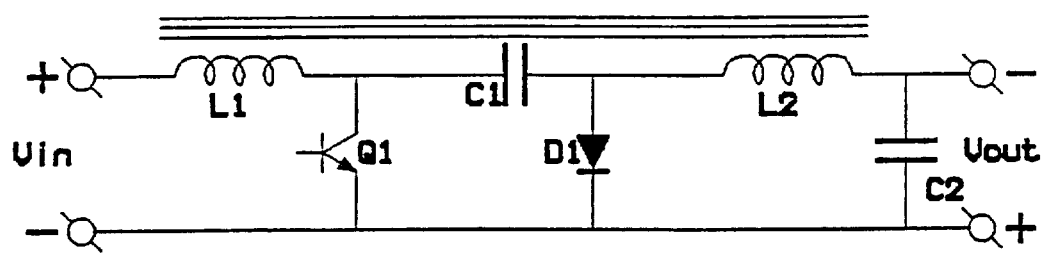
FIG. 2 is an extension of the converter shown in FIG. 1 wherein the input and output choke inductances are magnetically coupled.
Figure 3:
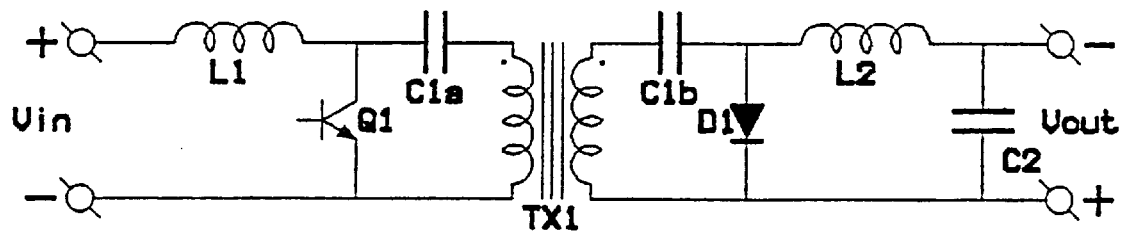
FIG. 3 is a further extension of a basic topology Ćuk converter wherein an isolation transformer is introduced between the input and out terminals.
Figure 4:
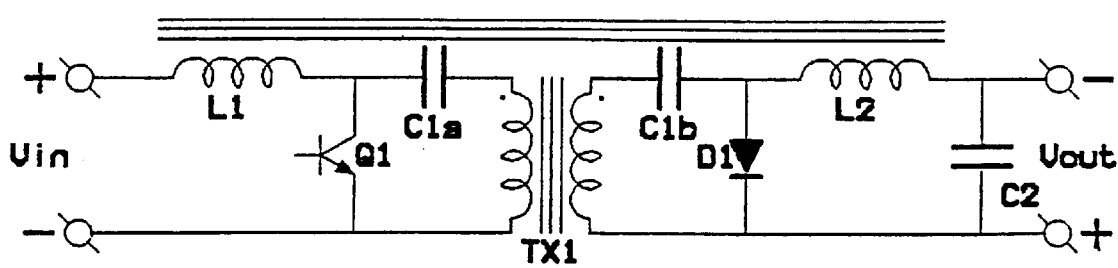
FIG. 4 illustrates a combination of the circuitry shown in FIGS. 2 and 3.
Figure 5:
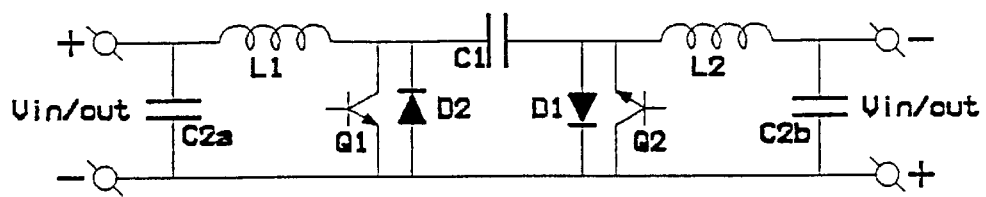
FIG. 5 shows a modification to a basic topology Ćuk converter which permits bi-directional power flow.
Figure 6:
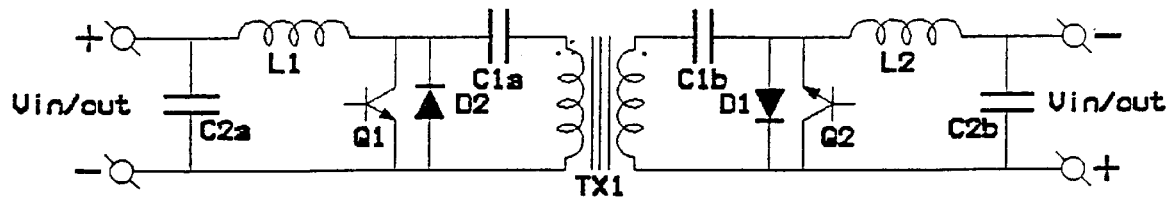
FIG. 6 is an extension of the converter of FIG. 5 wherein an isolating transformer is introduced between the input and output terminals.
Figure 7:
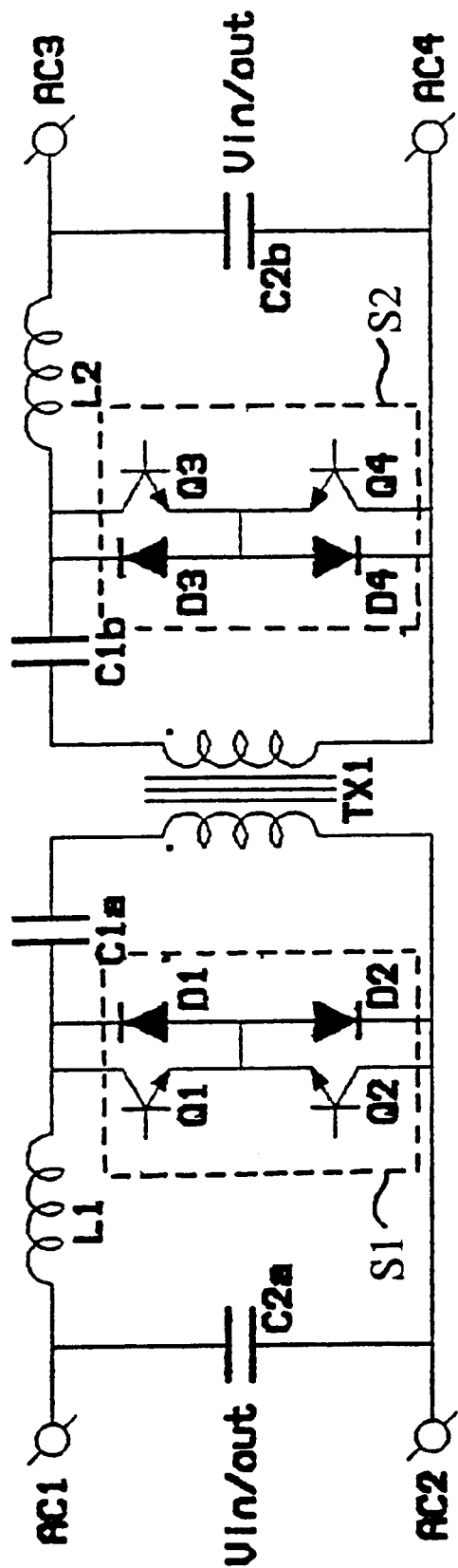
Figure 8:
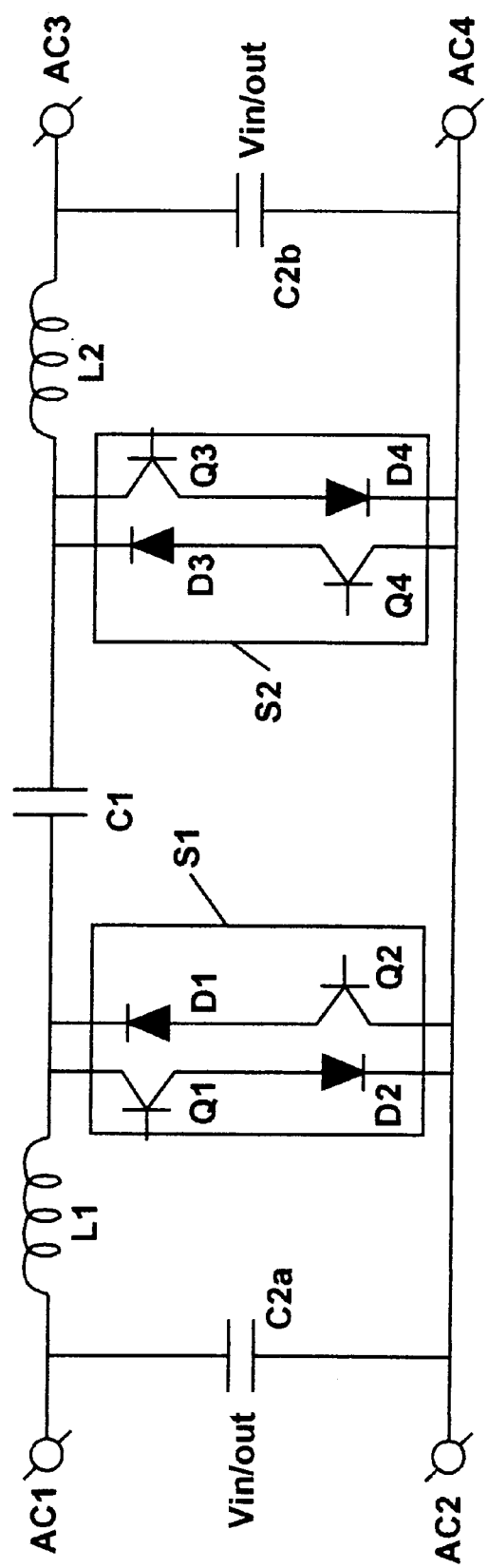

FIG. 7 shows a bi-directional AC or DC voltage regulator/transformer according to the invention in which the input and output circuits are coupled through an isolating transformer; and FIG. 8 shows a bi-directional AC or DC voltage regulator/transformer according to the invention with a slightly different topography geometry of the switching networks and in which the input and output circuits are directly coupled through a capacitor.

DESCRIPTION OF PREFERRED EMBODIMENTS

FIGS. 1 to 6 have been described above in the 'background art' section of this Specification.

Referring to FIG. 7 of the drawings, a bi-directional AC or DC voltage regulator/transformer according to the invention comprises an input circuit and an output circuit which is symmetrical to the input circuit. As the regulator/transformer is fully symmetrical with regard to the input and output terminals, power may flow in either direction giving the regulator/transformer its bi-directional characteristics. As such, the input and output terminals can be interchanged. The regulator/transformer will first be described with reference to an AC input.

Since the two circuits are symmetrical, it is only necessary to describe the arrangement of the components within one of the circuits. This is sufficient to develop a full understanding of the construction of the regulator/transformer.

The input circuit has two terminals AC1 and AC2 across which are connected a capacitor C2a and, in parallel with the capacitor C2a, a choke inductor L1 serially connected to an energy-transfer capacitor C1a which in turn is connected to a winding of an isolating transformer TX1 that magnetically couples the input and output circuits. A switching network S1, comprising two diodes D1 and D2 and two transistors Q1 and Q2, is connected between the inductor L1/capacitor C1a junction and the transformer winding/terminal AC2 junction of the circuit.

Firstly it is necessary to consider a period during which terminal AC1 is positive with respect to terminal AC2 and load current is in phase with load voltage. Transistor Q2 and transistor Q3 are held on and therefore, in conjunction with diode D2 and diode D3, provide bi-directional current paths. During this period transistors Q1 and Q4 switch alternately at high frequency in response to a high frequency control signal from the controller. For a first time interval of this high frequency alternation, transistor Q1 is off and transistor Q4 is on. During this interval diode D4 is forward biased and the energy transfer capacitors C1a and C1b charge through the choke inductor L1. During a second time interval of the high frequency alternation, the switching states of transistors Q1 and Q4 are reversed. Once this occurs, the energy transfer capacitors C1a and C1b discharge, driving current through the output load via inductance L2, and charging the output capacitor C2b. Circuit operation is repeated when transistor Q1 is turned off and transistor Q4 is turned on again.

Secondly it is necessary to consider a period during which terminal AC1 is positive with respect to terminal AC2 and load current is out of phase with load voltage. Transistor Q2 and transistor Q3 are held on and therefore, in conjunction with diode D2 and diode D3, provide bi-directional current paths. During this period transistors Q1 and Q4 switch alternately at high frequency in response to the high frequency control signal from the controller. For a first time interval of this high frequency alternation, transistor Q4 is off and transistor Q1 is on. During this interval diode D1 is forward biased and the energy transfer capacitors C1a and C1b charge through the choke inductor L2. During a second time interval of the high frequency alternation, the switching states of transistors Q1 and Q4 are reversed. Once this occurs, the energy transfer capacitors C1a and C1b discharge, driving current out through the input terminals via inductance L1, and charging the input capacitor C2a. Circuit operation is repeated when transistor Q4 is turned off and transistor Q1 is turned on again.

Thirdly it is necessary to consider a period during which terminal AC1 is negative with respect to terminal AC2 and load current is in phase with load voltage. Transistor Q1 and transistor Q4 are held on and therefore, in conjunction with diode D1 and diode D4, provide bi-directional current paths. During this period transistors Q2 and Q3 switch alternately at high frequency in response to the high frequency control signal from the controller. For a first time interval of this high frequency alternation, transistor Q2 is off and transistor Q3 is on. During this interval diode D3 is forward biased and the energy transfer capacitors C1a and C1b charge through the choke inductor L1. During a second time interval of the high frequency alternation, the switching states of transistors Q2 and Q3 are reversed. Once this occurs, the energy transfer capacitors C1a and C1b discharge, driving current through the output load via inductance L2, and charging the output capacitor C2b. Circuit operation is repeated when transistor Q2 is turned off and Q3 is turned on again.

Fourthly it is necessary to consider a period during which terminal AC1 is negative with respect to terminal AC2 and load current is out of phase with load voltage. Transistor Q1 and transistor Q4 are held on and therefore, in conjunction with diode D1 and diode D4, provide bi-directional current paths. During this period transistors Q2 and Q3 switch alternately at high frequency in response to the high frequency control signal from the controller. For a first time interval of this high frequency alternation, transistor Q3 is off and transistor Q2 is on. During this interval diode D2 is forward biased and the energy transfer capacitors C1a and C1b charge through the choke inductor L2. During a second time interval of the high frequency alternation, the switching states of transistors Q2 and Q3 are reversed. Once this occurs, the energy transfer capacitors C1a and C1b discharge, driving current out through the input terminals via inductance L1, and charging the input capacitor C2a. Circuit operation is repeated when transistor Q3 is turned off and transistor Q2 is turned on again.

The output voltage $V_{out}$ across the output terminals AC3 and AC4 is dependent upon the input voltage $V_{in}$ and the high frequency switching duty cycle of S1 and S2. Thus if the input voltage amplitude $V_{in}$ is sinusoidal, the output voltage $V_{out}$ will follow in proportion dependent upon the high frequency switching duty cycle of S1 and S2 and the turns ratio of the isolating transformer TX1.

When pairs of transistors are switched in the manner described above, it is possible to transform AC voltages in proportion to the duty cycle of the control signal and the turns ratio of the transformer TX1. In addition refinement of the high frequency control signal source, which alternately controls pairs of transistors, will permit harmonic distortion correction, synthesis of harmonics and/or fast acting regulation control to compensate for voltage drops in the circuit, mains voltage fluctuations and load variance. The frequency of the control signal is preferably from one to several orders of magnitude greater than the AC input frequency and may be, for example, from 500 Hertz to 250 Khertz.

It will readily be understood from the above description that exactly the same circuitry and controller will produce, from a DC input, a regulated DC output. Power can flow through the converter in either direction, whether used with an AC supply or a DC supply.

In FIG. 7 the two branches of each switching network S1 and S2 are illustrated as a pair of series-connected transistors and diodes, Q1–D2 and Q2–D1 for example, connected at their transistor-diode junctions. This topography enables the use of integrated circuit sub-assemblies of Q1 and D1, and Q2 and D2. Functionally, however, the transistor-diode uni-directional switching means of FIG. 7 is exactly the same as that of FIG. 8 in which two discrete branches are shown for each switching network.

In FIG. 8 the input circuit and output circuit are shown as being coupled, not by the capacitors C1a and C1b and isolating transformer TX1 of FIG. 7, but by a capacitor C1 which is connected between the inductor (L1,L2)/switching network (S1;S2) junctions of both circuits; and by a direct connection of the switching network (S1;S2)/terminal (AC2; AC4) junctions of both circuits. The circuit of FIG. 8 loses the step up/step down function of the circuit of FIG. 7 which is achieved by choice of the turns ratio of the isolating transformer TX1, but still permits step up or down by control of the duty cycle and bi-directional AC or DC voltage regulation as otherwise described with reference to FIG. 7.

What is claimed is:

1. A bi-directional AC or DC voltage regulator having a controller, an input circuit and an output circuit, the input and output circuits being capacitively coupled one to the other and being symmetrical one relative to the other, wherein each circuit comprises two terminals (AC1, AC2; AC3, AC4) across which are connected a capacitor (C2a; C2b) and, in parallel with the capacitor (C2a; C2b), a series connection of an inductor (L1; L2) and a switching network (S1; S2) controlled by the controller, wherein;

each switching network (S1; S2) has two branches in anti-parallel, and each branch comprises a switching means (Q1,Q2; Q3,Q4) for permitting only uni-directional current flow, CHARACTERIZED IN THAT:

the controller operates at high frequency the switching means (Q1 or Q2) in the input circuit which, if closed, would permit current flow through the switching network (S1), and simultaneously operates the oppositely aligned switching means (Q4 or Q3) in the output circuit so that it is in the opposite switching state to the high frequency operated switching means (Q1 or Q2) in the input circuit.

2. A bi-directional AC or DC voltage regulator according to claim 1, wherein the capacitive coupling of the input and output circuits is provided by:

a) a capacitor (C1) which is connected between the inductor (L1; L2)/switching network (S1; S2) junctions of both circuits, and;

b) the connection of the switching network (S1;S2)/terminal (AC2; AC4) junctions of both circuits.

3. A bi-directional AC or DC voltage regulator according to claim 1, wherein the capacitive coupling of the two circuits comprises:

a serial network, comprising a capacitor (C1*a*; C1*b*) and a winding of an isolating transformer (TX1), connected in parallel across the switching network (S1; S2) of each circuit, such that each circuit is connected to a different winding of the isolating transformer (TX1), wherein the capacitor (C1*a*; C1*b*) terminal of each serial network is connected to the inductor (L1; L2)/switching network (S1; S2) junction and the winding terminal of each serial network is connected to the switching network (S1; S2)/terminal (AC2; AC4) junction.

4. A bi-directional AC or DC voltage regulator according to claim 3, wherein:

the turns ratio of the transformer (TX1) is selected so as to establish the required output voltage range for a given input voltage.

5. A bi-directional AC or DC voltage regulator according to any preceding claim, wherein:

the inductor (L1) of the input circuit is magnetically coupled to the inductor (L2) of the output circuit.

6. A bi-directional AC or DC voltage regulator according to any preceding claim, wherein:

each switching means comprises a series connection of a transistor (Q1, Q2; Q3, Q4) and an aligned diode (D2, D1; D4, D3).

7. A bi-directional AC or DC voltage regulator according to any preceding claim, wherein:

the controller monitors the polarity of the input voltage so as to establish which pair of the switching means (Q1,D2 or Q2,D1 in the input circuit, and Q4,D3 or Q3,D4 in the output circuit) would, if closed, permit current to flow through the respective switching networks (S1 and S2).

8. A bi-directional AC or DC voltage regulator according to any preceding claim, wherein:

the duty cycle of the switching means (Q1 or Q2) in the input circuit and the switching means (Q4 or Q3) in the output circuit operated at high frequency can be varied so as to vary the actual output voltage within an output voltage range.

9. A bi-directional AC or DC voltage regulator according to any preceding claim, wherein:

the switching means (Q2 or Q1) in the input circuit and the switching means (Q4 or Q3) in the output circuit which are not operated by the controller at high frequency are held closed.

\* \* \* \* \*